(12) United States Patent
Zheng et al.

(10) Patent No.: US 8,817,497 B2
(45) Date of Patent: Aug. 26, 2014

(54) SWITCHING POWER CONVERTER FOR REDUCING EMI FROM RING OSCILLATION AND ITS CONTROL METHOD

(75) Inventors: Jun Zheng, Guangdong (CN); Eng Hwee Quek, Singapore (SG); Huaming Guo, Guangdong (CN)

(73) Assignee: Dialog Semiconductor Inc., Campbell, CA (US)

( * ) Notice: Subject to any disclaimer, the term of this patent is extended or adjusted under 35 U.S.C. 154(b) by 566 days.

(21) Appl. No.: 13/131,587

(22) PCT Filed: Dec. 3, 2008

(86) PCT No.: PCT/CN2008/001964
§ 371 (c)(1),
(2), (4) Date: May 26, 2011

(87) PCT Pub. No.: WO2010/063139
PCT Pub. Date: Jun. 10, 2010

(65) Prior Publication Data
US 2011/0228569 A1    Sep. 22, 2011

(51) Int. Cl.
*H02M 3/335* (2006.01)
*H02M 1/44* (2007.01)

(52) U.S. Cl.
CPC ............ *H02M 3/33507* (2013.01); *H02M 1/44* (2013.01)
USPC ...................................................... 363/21.16

(58) Field of Classification Search
USPC ............ 363/21.04, 21.07, 21.08, 21.1, 21.12, 363/21.16, 21.18
See application file for complete search history.

(56) References Cited

U.S. PATENT DOCUMENTS

| | | | | |
|---|---|---|---|---|
| 5,986,617 A | * | 11/1999 | McLellan | ...................... 343/860 |
| 6,272,024 B2 | * | 8/2001 | Uchida | ...................... 363/21.12 |
| 6,344,982 B1 | | 2/2002 | Morimoto | |
| 6,404,654 B1 | * | 6/2002 | Wang | .............................. 363/19 |
| 7,130,204 B2 | | 10/2006 | Tsuruya | |

(Continued)

FOREIGN PATENT DOCUMENTS

| | | | |
|---|---|---|---|
| JP | 6335245 A | 12/1994 | |
| JP | 7222021 A | 8/1995 | |

OTHER PUBLICATIONS

State Intellectual Property Office of the People's Republic of China, First Office Action, Chinese Patent Application No. 200880132221.7, Apr. 26, 2013, thirteen pages.

(Continued)

*Primary Examiner* — Matthew Nguyen
*Assistant Examiner* — Jeffrey Gblende
(74) *Attorney, Agent, or Firm* — Fenwick & West LLP (57) ABSTRACT

A switching power converter (200, 300, 400, 500) comprises a transformer (211) with a parasitic capacitance (212), a first switch (207) coupled to the transformer (211) and configured to couple or decouple a load (219) to or from a power source via the transformer (211), a switch controller (205) coupled to the first switch (207) and configured to generate a switch drive signal (206) for turning on or off the first switch (207) according to switching cycles, and a bypass circuit configured to provide a bypass path for the parasitic elements such as the parasitic capacitance (212). The bypass circuit may be coupled in parallel with the auxiliary winding (220), the primary winding (213), or the secondary winding (214) of the transformer (211). High frequency ringing and EMI/RFI is reduced when the bypass circuit is enabled.

17 Claims, 8 Drawing Sheets

(56) References Cited

U.S. PATENT DOCUMENTS

2001/0036092 A1* 11/2001 Yasumura .................. 363/21.04
2002/0075700 A1*  6/2002 Birumachi ...................... 363/25
2003/0174522 A1*  9/2003 Xu et al. ......................... 363/22
2006/0006850 A1*  1/2006 Inoue et al. ................... 323/265

OTHER PUBLICATIONS

International Search Report and Written Opinion, PCT/CN2008/001964, Sep. 17, 2009, 12 pp.

* cited by examiner

SWITCHING POWER CONVERTER FOR REDUCING EMI FROM RING OSCILLATION AND ITS CONTROL METHOD

BACKGROUND OF THE INVENTION

1. Field of the Invention

The present invention relates to switching power converters and, more specifically, to reducing EMI (Electro-Magnetic Interference) caused by ring oscillation in switching power converters.

2. Description of the Related Arts

Compact and efficient switching power supplies are enjoying increasing popularity because they offer both compactness and high operating efficiency. Low efficiency linear power supplies use highly dissipative series pass elements to achieve output regulation. Switching power supplies achieve high efficiency by controlling ON and OFF power cycles of the power switch, delivering precise amounts of energy to the load while maintaining output regulation. The timing of the ON and OFF cycles determines the operating frequency of the switching power supply. The control of the ON and OFF cycles is typically achieved via well known modulation techniques, most notably pulse-width-modulation and/or pulse-frequency-modulation. Power transistors such as a bipolar transistor or a MOSFET device are employed as the switching device in switching power supplies, and are employed in one of a number of conventional topologies, such as flyback, buck, boost, buck-boost, etc.

It is desirable to operate the switching power converter at a high operating frequency in order to reduce the size of power conversion and filter components. These components include power transformers and inductors as well as output filter components such as capacitors and inductors. Depending on the topology of the switching power converter, output power, and other factors, the typical operating frequency of switching power supplies ranges from 10 KHz to 2 MHz.

However, one disadvantage resulting from the high operating frequency of switching power supplies is the generation of high frequency oscillation noise created by parasitic elements present in the switching power supply circuit. The frequency of the high frequency oscillation noise is typically many times higher than the operating frequency of the switching power supply. Furthermore, the EMI filter circuit of switching power converters is designed for optimal effectiveness at the operating frequency of the switching power converters, and is therefore ineffective at suppressing the high frequency oscillation noise caused by the parasitic elements. Therefore, additional circuitry is required to specifically suppress and absorb the high frequency oscillation noise.

Conventional techniques for suppressing the high frequency oscillation noise in switching power converters include the use of a special EMI filter (such as common mode inductor) or resistor and capacitor (RC) snubber circuits that are frequency matched to the high frequency oscillation noise. This technique has a number of disadvantages. First, they are designed to absorb the noise energy, and therefore are dissipative, negatively impacting the operational efficiency of the switching power supply. Second, the parasitic elements that cause the high frequency oscillation noise vary from component to component and thus from power supply to power supply. This, in combination with the component tolerance of the snubber circuit components, limits the effectiveness of the snubber circuit, especially in products that are in high volume manufacture. Third, snubber circuits or special EMI filters add to the cost and complexity of the switching power supplies.

The high frequency oscillation noise is a major cause of EMI and RFI (Radio Frequency Interference) noise. In the case of AC to DC power supplies, it is desirable to prevent noise from being transferred to the AC mains, as it negatively impacts the operation of other equipment connected to the AC mains. AC to DC switching power supplies often include an EMI filter circuit which is positioned between the AC mains and the EMI-generating switching circuit. The EMI filter is specifically designed to absorb the EMI energy produced by the switching power supply and preventing the EMI energy from being transferred to the AC mains. Once again, this has the same disadvantages as the snubber circuit or special EMI filter described above is dissipative, has limited effectiveness due to component tolerances, and adds to system cost and complexity.

Figure 1A:
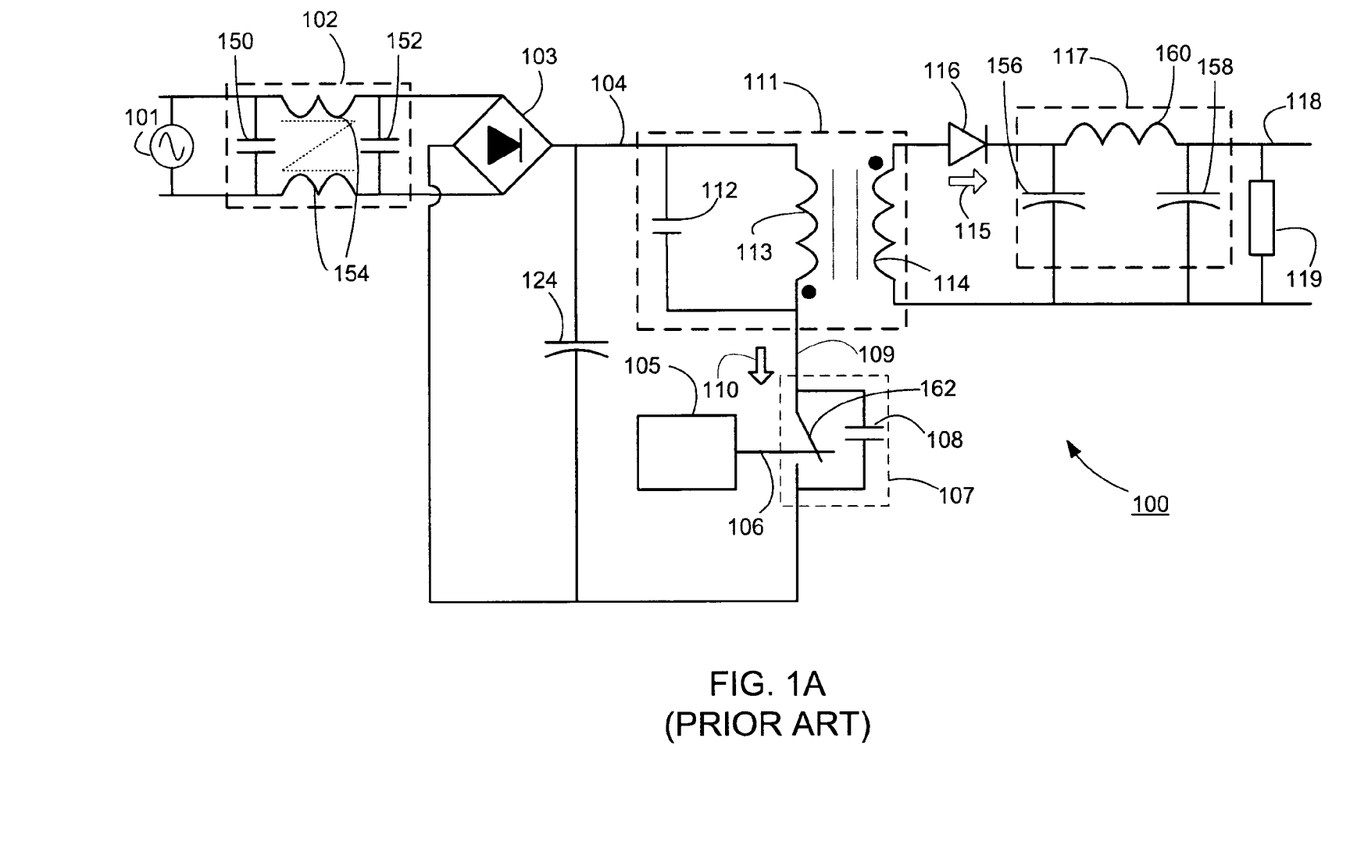
FIG. 1A illustrates a conventional AC to DC flyback switching power supply.

Consider, for example, the conventional switching power supply illustrated in FIG. 1A, which shows a conventional AC to DC flyback switching power supply 100. The power converter 100 includes three principal sections, i.e., the front end, power stage, and secondary stage. The front end is directly connected to the AC voltage source 101, and includes EMI filter 102, bridge rectifier 103, and bulk capacitor 124. The output of the front end section is an unregulated DC input voltage 104. The EMI filter 102 is generically represented by two line-to-line capacitors 150, 152, and a common mode inductor 154, but designs can vary by power supply design.

The power stage is comprised of a power transformer 111, power switch 107, and switch controller 105. Power transformer 111 includes a primary winding 113, a secondary winding 114, and a parasitic capacitance 112. In addition to the switch element 162, power switch 107 comprises a parasitic switch capacitance 108. Switch controller 105 maintains output regulation via control of the ON and OFF states of power switch 107 via a control signal 106. Power supply controller 105 can employ any one of a number of well known modulation techniques, such as pulse-width-modulation (PWM) and pulse-frequency-modulation (PFM), to control the ON and OFF states and duty cycles of power switch 107.

The secondary stage is comprised of output rectifier 116 and output filter 117. The output filter 117 is generically represented by two output filter capacitors 156 158 and an output filter inductor 160, but designs can vary. The resulting regulated output voltage 118 is delivered to the load 119.

Figure 1B:
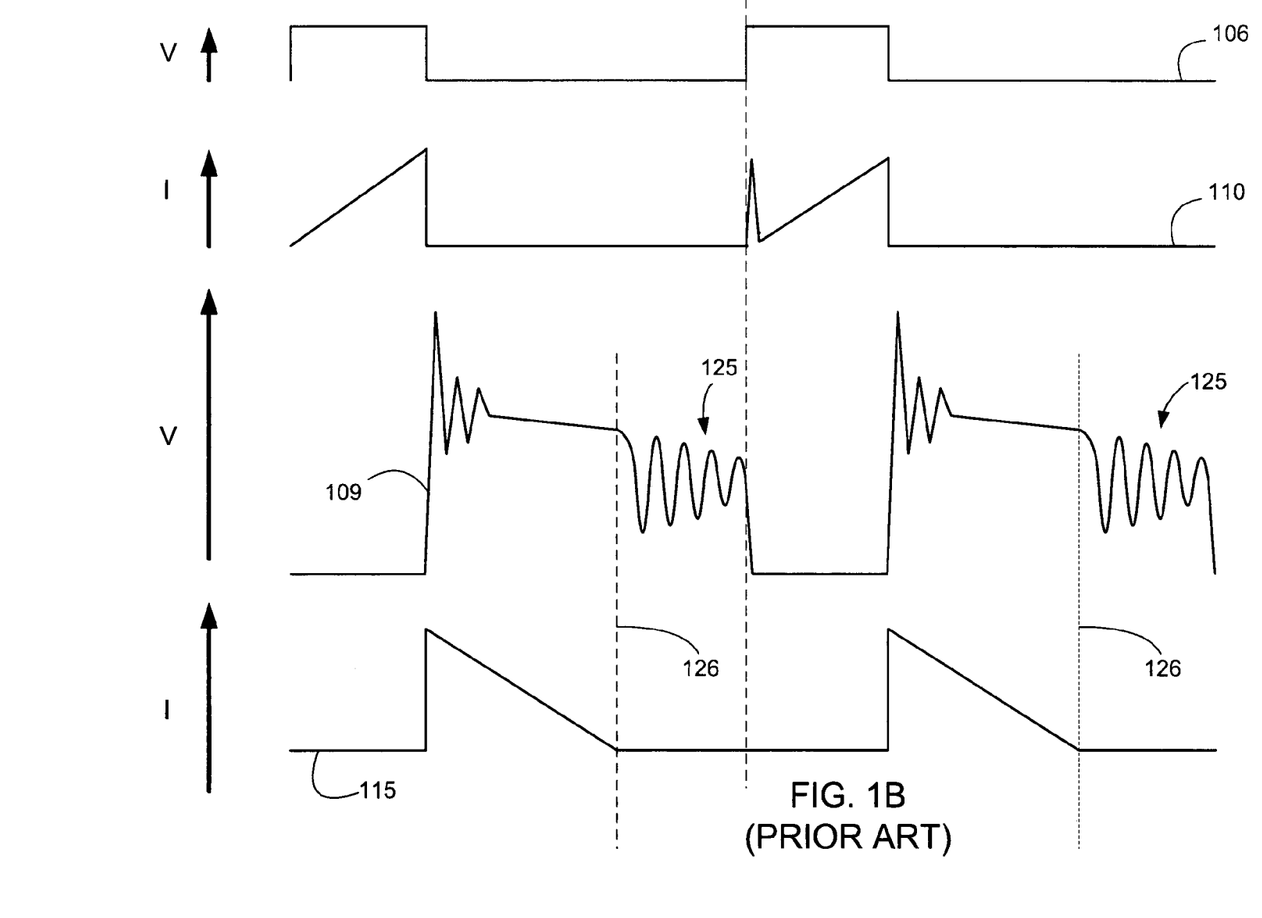
FIG. 1B illustrates the operational waveforms of the conventional flyback switching power supply of FIG. 1A.

FIG. 1B illustrates the basic operational waveforms of the flyback switching power supply 100 of FIG. 1A. As explained above, switch controller 105 outputs a control signal 106 (in voltage form), which defines the ON and OFF states of power switch 107. Primary current 110 illustrates the current through power switch 107 and the primary winding 113. Referring to FIG. 1B in conjunction FIG. 1A, when control signal 106 is high and thus power switch 107 is in the ON state, primary current 110 ramps up. The rate of ramp up of primary current 110 is predominantly based on the DC input voltage 104 and the magnetizing inductance of primary winding 113. The voltage across power switch 107 is illustrated as switch voltage 109. When power switch 107 is in the ON state, switch voltage 109 is equal to 0 volt (not including voltage created by such factors as the drain-source resistance Rds-on of power switch 107). Furthermore, output rectifier 116 is reversed biased, and output current 115 is equal to 0 A. Thus, while power switch 108 is in the ON state, energy is stored in power transformer 111. When control signal is 0 volt (low) and the power switch 107 is switched to the OFF state, output rectifier 116 becomes forward biased and energy stored in power transformer 111 is delivered to the secondary side based on the turns ratio of the primary winding 113 and the secondary winding 114. As the energy stored in power transformer 111 is delivered to the secondary stage, secondary current 115 spikes up and then starts to ramp down. When all of the energy stored in power transformer 111 is delivered to the secondary stage, secondary current 115 becomes equal 0 A, which point is also referred to as the transformer reset point 126. If power switch 107 remains in the OFF state beyond the transformer reset point 126, the switch voltage 109 exhibits high frequency ringing, generally occurring during voltage ringing period 125.

Figure 1C:
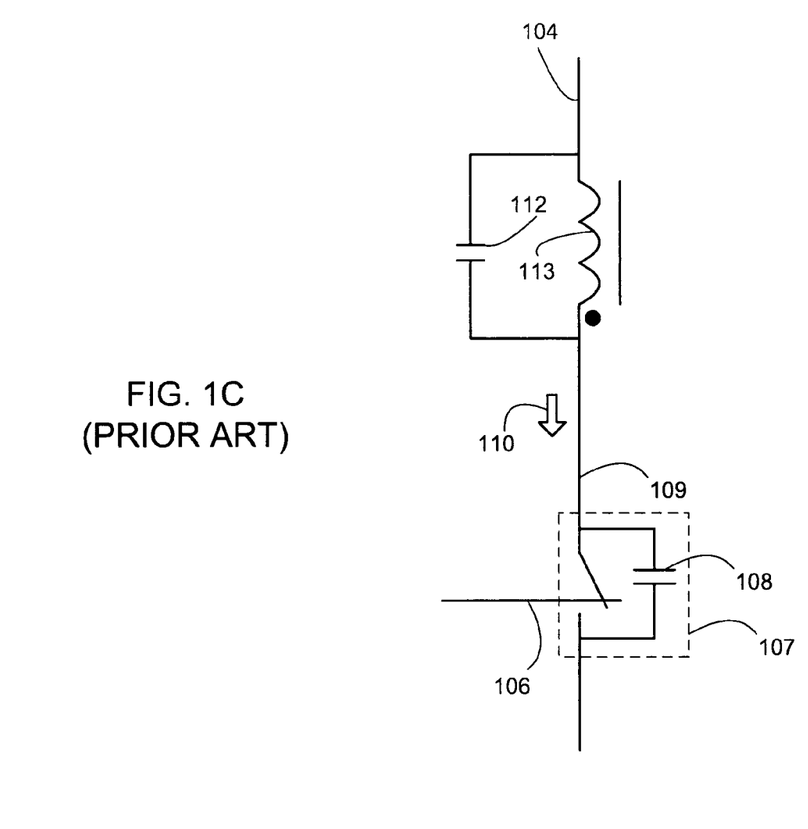
FIG. 1C illustrates a simplified equivalent circuit of the magnetizing inductance of the primary winding, parasitic capacitance of the primary winding, and switch capacitance in the conventional flyback switching power supply of FIG. 1A.

High frequency noise, generally occurring during voltage ringing period 125, is caused by parasitic elements in the switching power supply circuit and is predominantly caused by the magnetizing inductance of primary winding 113, the parasitic capacitance 112 of primary winding 113, and switch capacitance 108. FIG. 1C is a simplified equivalent circuit of magnetizing inductance of primary winding 113, the parasitic capacitance 112 of primary winding 113, and switch capacitance 108. As shown in FIG. 1C, when power switch 107 is turned OFF, parasitic capacitance 108 and parasitic capacitance 112 are coupled in series to the magnetizing inductance of primary winding 113, and generates high frequency noise during voltage ringing period 125. The high frequency noise is generally many times higher in frequency than the operating frequency of switching power supply 100, and is a major cause of EMI/RFI noise. This requires special filtering circuitry to absorb the noise energy caused by these parasitic elements. EMI filter 102 is principally responsible for absorbing EMI noise energy in order to prevent EMI noise produced by the switching power supply 100 from being transferred to AC voltage source 101.

SUMMARY OF THE INVENTION

Embodiments of the present invention include a switching power converter in which the parasitic elements of a transformer in the switching power converter is bypassed by enabling bypass circuitry during a certain part of each switching cycle of the switching power converter. In one embodiment, the switching power converter comprises a transformer with inductance and parasitic capacitance, a first switch coupled to the transformer and configured to couple or decouple a load to or from a power source via the transformer, a switch controller coupled to the switch and configured to generate a switch drive signal for turning on or off the first switch according to switching cycles, and a bypass circuit configured to provide a bypass path for the parasitic elements such as the parasitic capacitance. A bypass controller is coupled to the bypass circuit and the switch controller. The bypass controller receives a control interface signal from the switch controller and is configured to generate a bypass control signal for enabling or disabling the bypass circuit. The bypass circuit may be coupled in parallel with the auxiliary winding, the primary winding, or the secondary winding of the transformer of the switching power converter.

In one embodiment, the bypass controller generates the bypass control signal to enable the bypass circuit after a transformer reset point within each switching cycle of the switching power converter. In another embodiment, the bypass controller generates the bypass control signal to enable the bypass circuit after a zero-voltage switching point within each switching cycle of the switching power converter. In still another embodiment, the bypass controller generates the bypass control signal to disable the bypass circuit within each switching cycle prior to the beginning of a subsequent switching cycle.

The switching power converter according to various embodiments of the present invention has the advantage that high frequency ringing is significantly reduced when the bypass circuit is enabled. As a result, EMI is also significantly reduced.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

According to various embodiments of the present invention, a non-dissipative circuit is employed to prevent the generation of high frequency noise in switching power supplies. Conditions when high frequency ring oscillation would be normally generated in a switching power supply are sensed, and the parasitic elements of the switching power supply are bypassed when such conditions occur. A bypass circuit is used to effectively bypass such parasitic elements of the switching power supply to prevent the generation of high frequency noise. A control circuit determines the optimum timing of the switching on or off of the bypass circuit so as to not to negatively impact the operation of the switching power supply. Preventing the generation of high frequency noise reduces EMI and RFI noise, and eliminates or reduces the need for EMI and RFI filtering and other suppression circuits, thereby reducing the size, cost, and complexity of switching power supply designs.

Figure 2A:
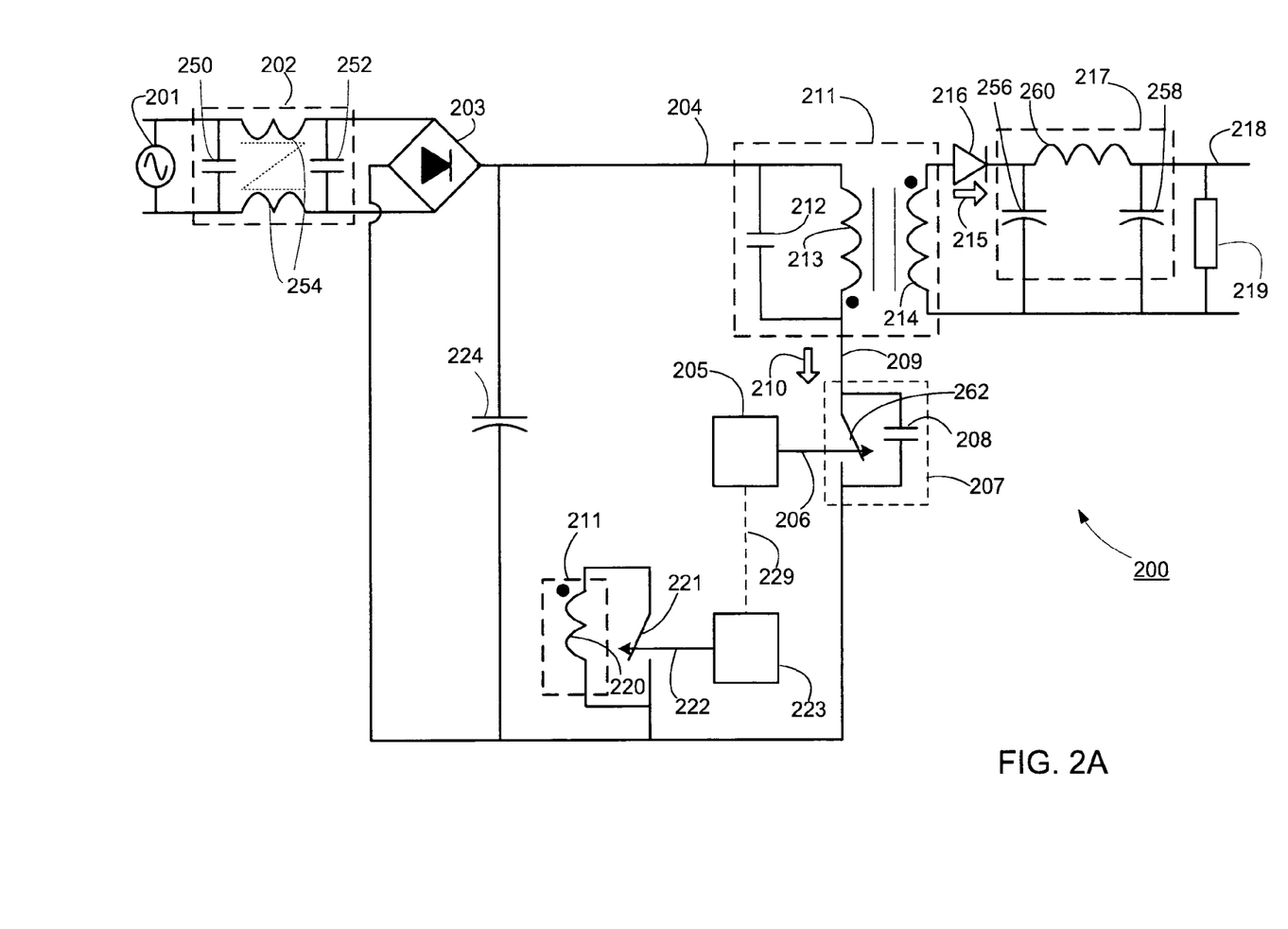
FIG. 2A illustrates a flyback switching power converter, according to a first embodiment of the present invention.

FIG. 2A illustrates an AC to DC flyback switching power converter 200, according to a first embodiment of the present invention. The power converter 200 is comprised of four principal sections, a front end, a power stage, a secondary stage, and a parasitic bypass circuit. In one embodiment, power converter 200 is controlled by PWM and utilizes primary side sensing for feedback.

The front end is directly connected to the AC voltage source 201, and includes EMI filter 202, bridge rectifier 203, and bulk capacitor 224. The frond end section receives the AC voltage source 201 and generates an unregulated DC input voltage 204. The EMI filter 202 is generically represented by two line-to-line capacitors 250, 252 and a common mode inductor 254, but designs can vary by power supply design depending on specific design requirements.

The power stage is comprised of a power transformer 211, power switch 207, and controller 205. Power transformer 211 includes a primary winding 213, a secondary winding 214, a parasitic capacitance 212, and an auxiliary winding 220. In addition to the switch element 262, power switch 207 comprises a parasitic switch capacitance 208. Controller 205 enables output regulation in the switching power supply 200 via control of the ON and OFF states and their switching timings of power switch 207 via a control signal 206. Controller 205 can employ any one or more of conventional modulation techniques, such as pulse-width-modulation (PWM) or pulse-frequency-modulation (PWM).

The secondary stage is comprised of output rectifier 216 and output filter 217. The output filter 217 is generically represented by two output filter capacitors 256, 258 and an output filter inductor 260, but designs can vary. The resulting regulated output voltage 218 is delivered to the load 219.

The parasitic bypass circuit is comprised of ring clamp switch 221 and bypass controller 223. Ring clamp switch 221 is connected across and in parallel with auxiliary winding 220 of transformer 211. Bypass controller 223 controls the ON/OFF states and transition timings of ring clamp switch 221 via ring clamp switch control signal 222. Bypass controller 223 determines the appropriate timings to turn on or off ring clamp switch 221 to reduce ringing in the switching power supply 200 based on a control interface signal 229 received from controller 205. When ring clamp switch 221 is turned on, auxiliary winding 220 is shorted and bypassed, and a bypass for the parasitic capacitance 212 is formed. When ring clamp switch 221 is turned off, auxiliary winding 220 performs its normal functions.

Figure 2B:
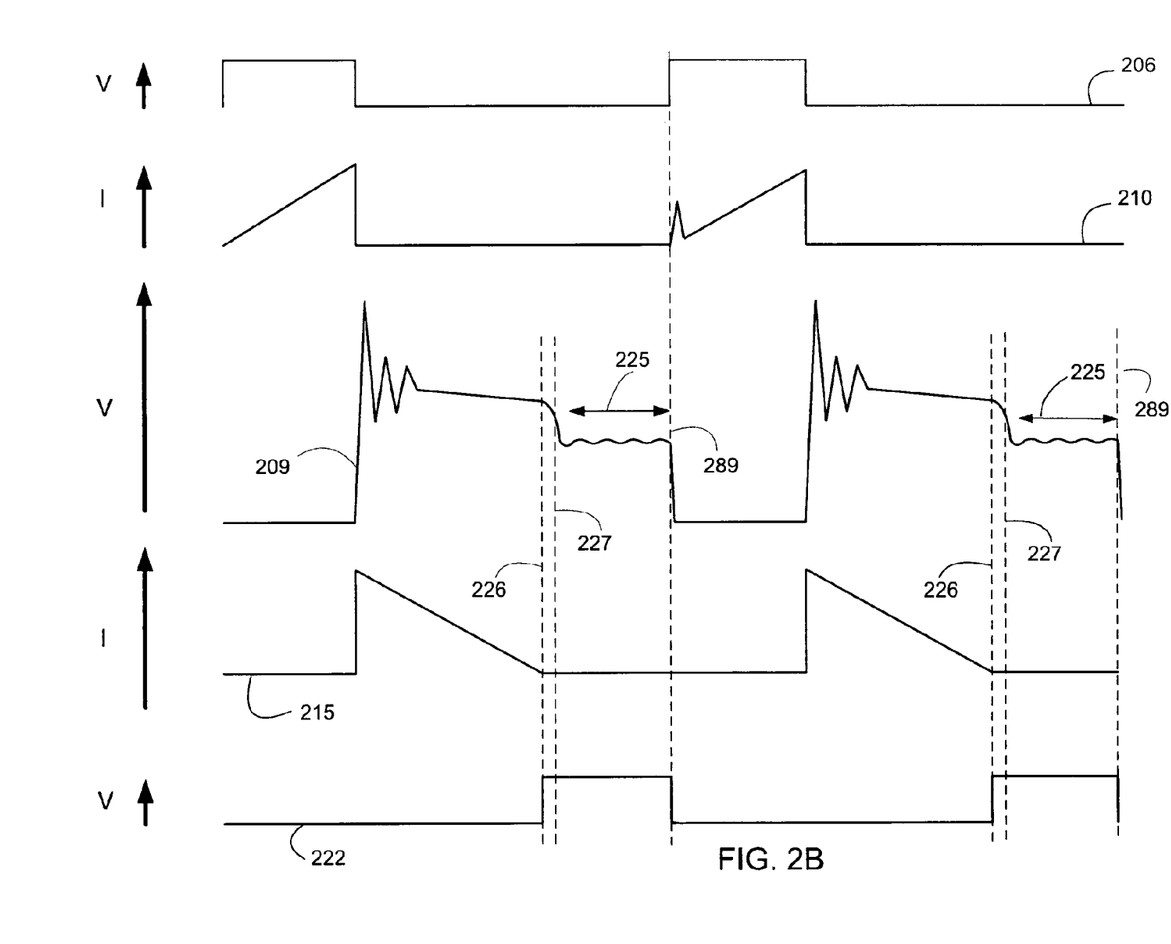
FIG. 2B illustrates the operational waveforms of the flyback switching power supply of FIG. 2A.

The operation of the parasitic bypass circuit will be explained in further detail below with reference to FIG. 2B, which illustrates the operational waveforms of the flyback switching power supply of FIG. 2A according to one embodiment of the present invention. Referring to FIGS. 2A and 2B, controller 205 outputs control signal 206, which determines the ON and OFF states and their ON/OFF transition timings of power switch 207. Primary current 210 is the current through the primary winding 213 and power switch 207.

As shown in FIG. 2B, when control signal 206 has high voltage and thus power switch 207 is in the ON state, primary current 210 ramps up. The rate of the current ramp of primary current 210 is predominantly based on the DC input voltage 204 and the magnetizing inductance of primary winding 213. Switch voltage 209 is the voltage across power switch 207. When power switch 207 is in the ON state, switch voltage 209 is equal to 0 V (not including voltage created by such factors as Rds-on). Furthermore, output rectifier 216 is reversed biased, and thus output current 215 is equal to 0 A. During this time, energy is stored in power transformer 211.

When control signal 206 has low voltage and power switch 207 is switched to the OFF state, output rectifier 216 becomes forward biased and energy stored in power transformer 211 is delivered to the secondary stage based on the turns ratio of the primary winding 213 and the secondary winding 214. As the energy stored in power transformer 211 is delivered to the secondary stage, secondary current 215 spikes up and then ramps down. When all of the energy stored in power transformer 211 is delivered to the secondary stage, secondary current 215 equals 0 A. This point is referred to as the transformer reset point 226 and occurs within each switching cycle of the switching power converter 200.

If power switch 207 remains in the OFF state beyond the transformer reset point 226, the switch voltage 209 would normally exhibit high frequency ringing, as explained above. The high frequency ringing, or noise, would be caused predominantly by the parasitic capacitance 212 of primary winding 213, the magnetizing inductance of primary winding 213, and switch capacitance 208, and generally occur during the ringing period 225. However, according to embodiments of the present invention, such high frequency ringing is prevented by use of the parasitic bypass circuit.

Specifically, ring clamp controller 223 receives control interface signal 229 from controller 205, and sense the timings at which such high frequency ringing may occur, if not prevented. Since controller 205 generates the control signal 206 that causes the waveforms of the various signals 206, 210, 209, 215, and 222 of FIG. 2B to eventually occur in switching power converter 200 and especially the switch voltage 209, controller 205 may provide such timing information to ring clamp controller 223 via control interface signal 229. In one embodiment, control interface signal 229 provides such timing information in the form of digital data, and ring clamp controller 223 may also be implemented in digital circuitry or state machines. In another embodiment, the ring clamp controller 223 may turn on or off the ring clamp switch 221 based on direct sensing of the voltage or current on one or more of the windings of transformer 211, without using control interface signal 229.

Ring clamp controller 223 senses the time during which such high frequency ringing caused by parasitic elements would occur, if not prevented, generally represented by ringing period 225. In one embodiment, in anticipation of such ringing period 225, ring clamp controller 223 places ring clamp switch 221 in the ON state via ring clamp control signal 222 after the transformer reset point 226 within each switching cycle of the switching power converter 200, until the beginning 289 of the next switching cycle. A high voltage of the ring clamp control signal 222 places the ring clamp switch 221 to be in the ON state. When ring clamp switch 221 is turned on, it effectively creates a bypass of parasitic elements such as the parasitic capacitance 212. Bypassing parasitic elements during ringing period 225 significantly reduces the magnitude of the high frequency ringing voltage, resulting in reduction of EMI and RFI noise that is generated by the switching power supply 200. This eliminates or reduces the amount of additional dissipative filtering that may be required. Note that the bypass switch 221 is used with the auxiliary winding 220 in order to allow for use of ring clamp switch 220 with low voltage rating.

Ring clamp controller 223 may use a variety of parameters in order to determine the optimum time to place ring clamp switch 221 in the ON state. For example, ring clamp controller 223 may sense the transformer reset point 226 in anticipation of ringing period 225 and put the ring clamp switch 221 in the ON state at and beyond the transformer reset point 226. Similarly, ring clamp controller 223 may sense the zero voltage switching point 227, a point at which switch voltage 209 equals DC input voltage 204, and put the ring clamp switch 221 in the ON state at and beyond the zero voltage switching point 227. Furthermore, bypass controller 223 may also use a variety of parameters to determine the optimum time to place ring clamp switch 221 in the OFF state. For example, it would be undesirable to have power switch 207 and ring clamp switch 221 in the ON state at the same time, and thus bypass controller 223 puts ring clamp switch 221 in the OFF state in each switching cycle prior to the beginning 289 of the next switching cycle, i.e., prior to when control signal 206 becomes high again in the next switching cycle. Note that ring clamp controller 223 may be enabled or disabled via an enable signal/pin (not shown herein).

Figure 2C:
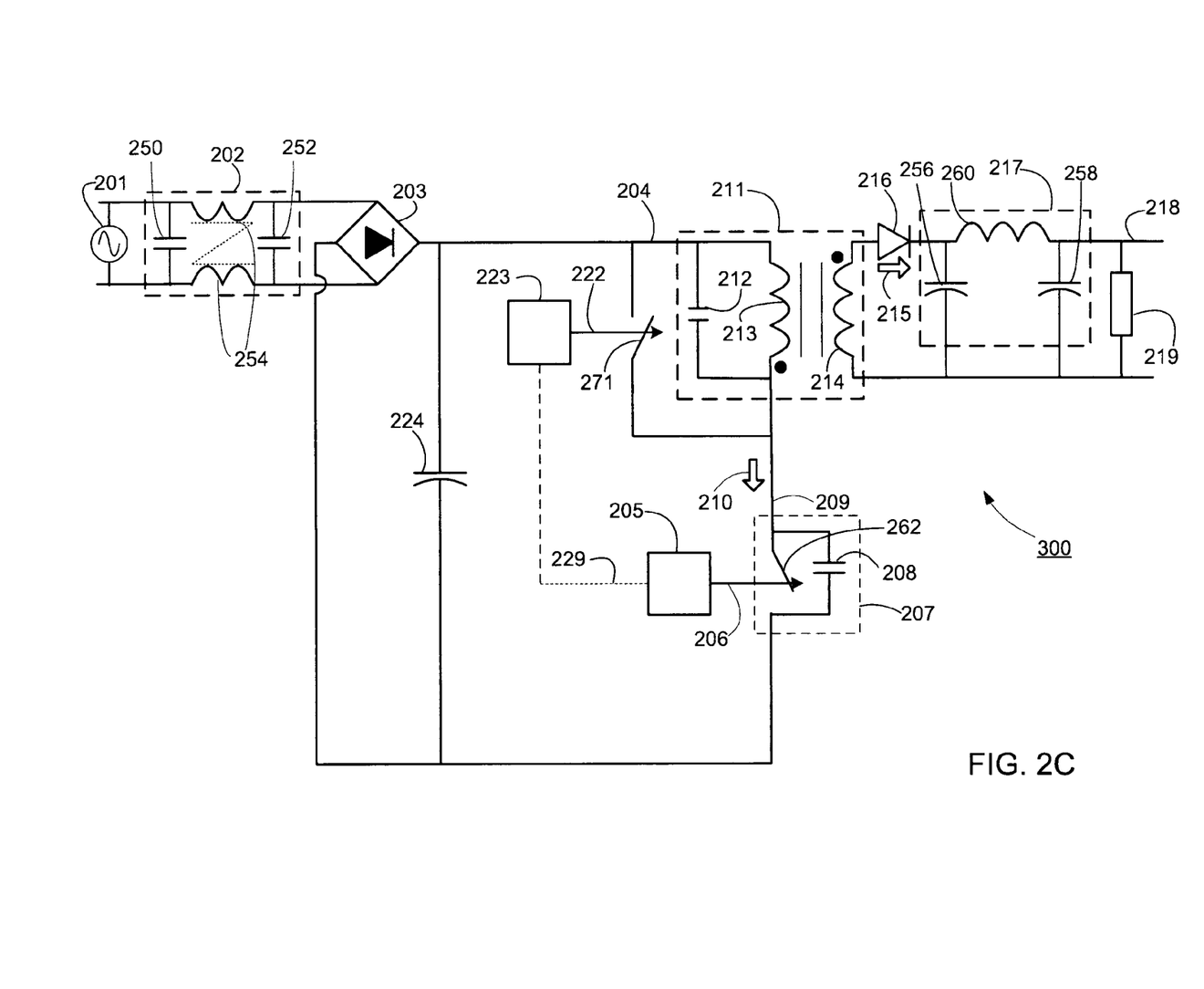
FIG. 2C illustrates a flyback switching power converter, according to a second embodiment of the present invention.

FIG. 2C illustrates a flyback switching power converter, according to a second embodiment of the present invention. The switching power converter 300 of FIG. 2C is substantially the same as the switching power converter 200 of FIG. 2A, except that ring clamp switch 271 is placed across and in parallel with primary winding 213 (and thus in parallel with parasitic capacitance 212). Thus, when ring clamp switch 271 is put in the ON state, a bypass of parasitic elements such as parasitic capacitance 212 is formed directly through ring clamp switch 271. The control of the various elements of switching power converter 300, ring clamp switch 271, and their timings may be carried out in substantially the same way as in the first embodiment of FIG. 2A, as shown in the waveforms of FIG. 2B.

Figure 2D:
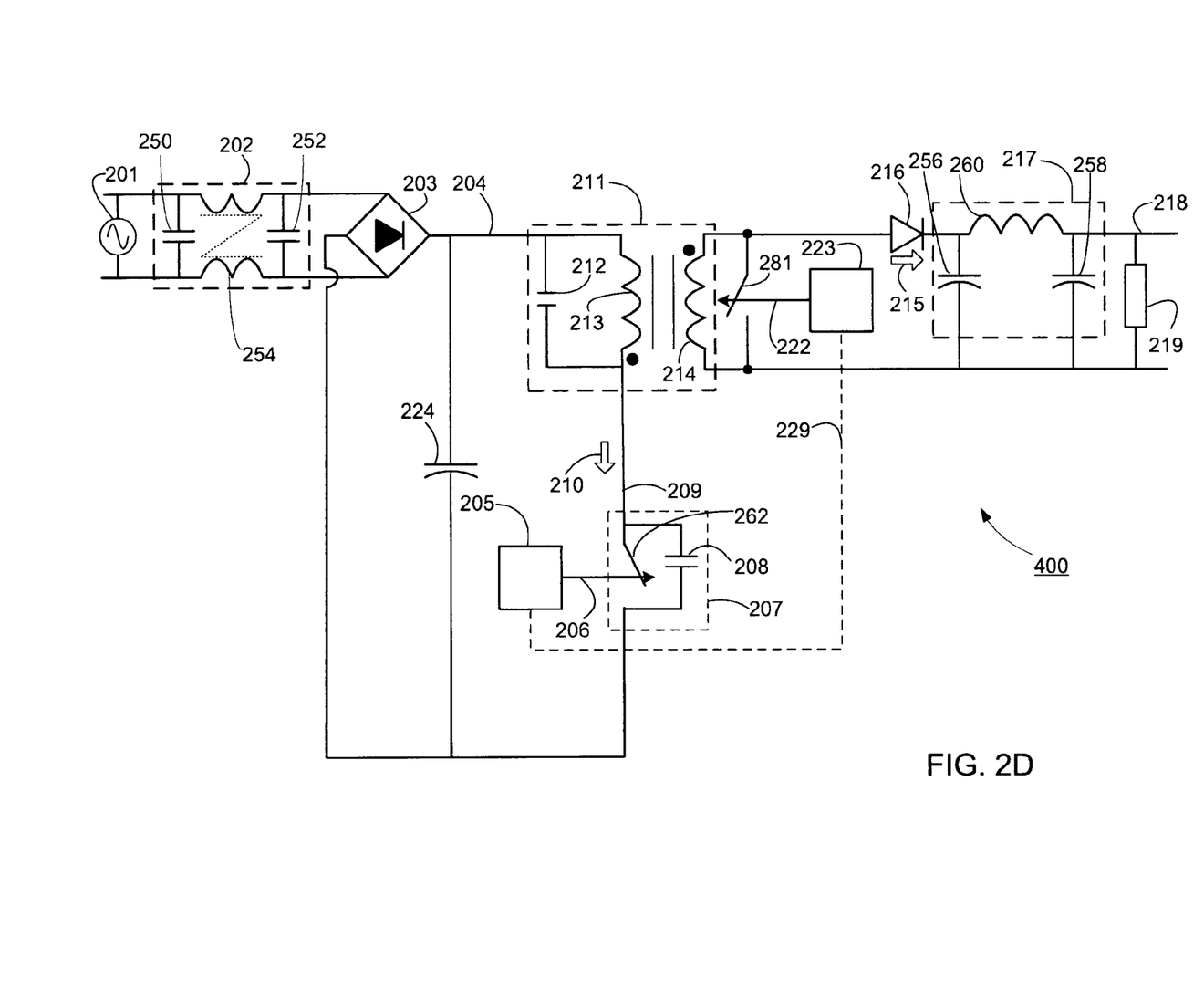
FIG. 2D illustrates a flyback switching power converter, according to a third embodiment of the present invention.

FIG. 2D illustrates a flyback switching power converter, according to a third embodiment of the present invention. The switching power converter 400 of FIG. 2D is substantially the same as the switching power converter 200 of FIG. 2A, except that ring clamp switch 281 is placed across and in parallel with secondary winding 214. When ring clamp switch 281 is put in the ON state, a bypass of parasitic elements such as parasitic capacitance 212 is formed directly through ring clamp switch 281. More specifically, while ring clamp switch 281 is turned on, the remnant energy is bypassed in transformer 211 and the impedance of primary winding 213 is very low (since the magnetic field is shorted). So the ringing is also bypassed. The control of the various elements of switching power converter 400, ring clamp switch 281, and their timings may be carried out in substantially the same way as in the first embodiment of FIG. 2A, as shown in the waveforms of FIG. 2B.

Figure 2E:
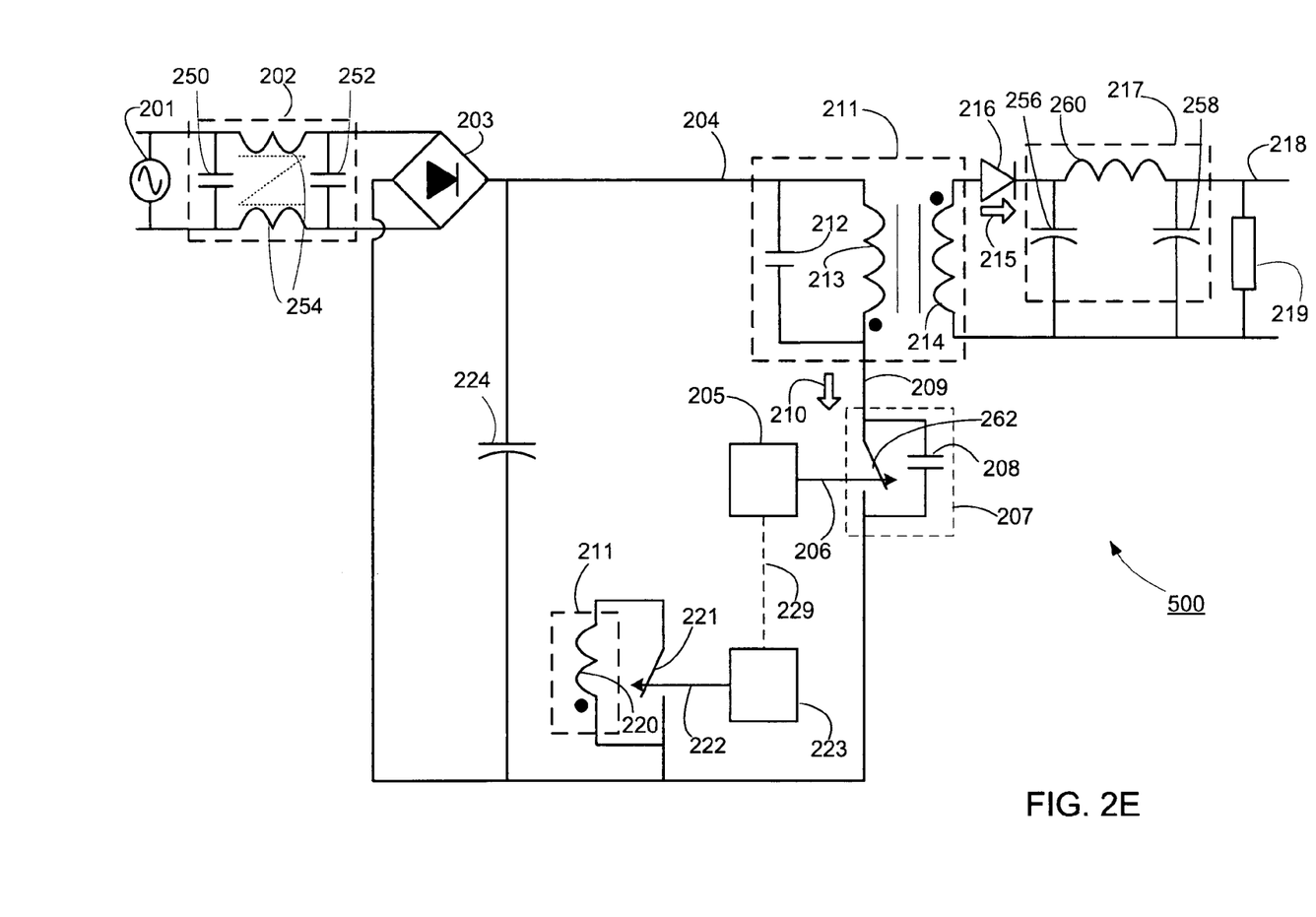
FIG. 2E illustrates a flyback switching power converter, according to a fourth embodiment of the present invention.

FIG. 2E illustrates a flyback switching power converter, according to a fourth embodiment of the present invention. The switching power converter 500 of FIG. 2E is substantially the same as the switching power converter 200 of FIG. 2A, except that the phase of auxiliary winding 220 is opposite to that in the first embodiment FIG. 2A. When ring clamp switch 221 is put in the ON state, a bypass of parasitic elements such as parasitic capacitance 212 is formed directly through ring clamp switch 221. The control of the various elements of switching power converter 500, ring clamp switch 221, and their timings may be carried out in substantially the same way as in the first embodiment of FIG. 2A, as shown in the waveforms of FIG. 2B.

The methodologies and embodiments disclosed and described herein may be applied to transformer-coupled switching power converters, such as flyback converters. In addition, direct-coupled switching power converters such as boost, buck/boost, and SEPIC (Single-Ended Primary Inductor Converter) power converters may also benefit from active prevention of high frequency noise as caused by parasitic elements in the switching power supply circuit.

Upon reading this disclosure, those of skill in the art will appreciate still additional alternative designs for reducing noise and EMI/RFI in switching power converters. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A switching power converter comprising:
   a transformer including parasitic capacitance;
   a first switch coupled to the transformer and configured to couple or decouple a load to or from a power source via the transformer;
   a switch controller coupled to the first switch and configured to generate a switch drive signal for turning on or off the first switch according to switching cycles;
   a bypass circuit configured to provide a bypass path for the parasitic capacitance of the transformer; and
   a bypass controller coupled to the bypass circuit and the switch controller, the bypass controller receiving a control interface signal from the switch controller and configured to generate a bypass control signal for enabling or disabling the bypass circuit based upon the control interface signal, wherein the bypass controller generates the bypass control signal to enable the bypass circuit after a transformer reset point within each switching cycle of the switching power converter, the transformer reset point corresponding to when current through the load equals zero in each switching cycle.

2. The switching power converter of claim 1, wherein the bypass controller generates the bypass control signal to enable the bypass circuit after a zero-voltage switching point within each switching cycle of the switching power converter, the zero-voltage switching point corresponding to when voltage across the first switch equals DC input voltage to the switching power converter in each switching cycle.

3. The switching power converter of claim 1, wherein the bypass controller generates the bypass control signal to disable the bypass circuit within each switching cycle prior to a beginning of a subsequent switching cycle.

4. The switching power converter of claim 1, wherein the control interface signal includes timing information on when the first switch is turned on or off in each switching cycle.

5. The switching power converter of claim 3, wherein the bypass circuit is enabled or disabled based upon direct sensing of voltage or current in a winding of the transformer.

6. The switching power converter of claim 1, wherein the bypass circuit comprises a second switch coupled in parallel with an auxiliary winding of the transformer, the bypass path including the second switch when the second switch is turned on.

7. The switching power converter of claim 1, wherein the bypass circuit comprises a second switch coupled in parallel with a primary winding of the transformer, the bypass path including the second switch when the second switch is turned on.

8. The switching power converter of claim 1, wherein the bypass circuit comprises a second switch coupled in parallel with a secondary winding of the transformer, the bypass path including the second switch when the second switch is turned on.

9. The switching power converter of claim 1, wherein the switching power converter is a flyback switching power converter with feedback sensing occurring on a primary side of the transformer.

10. A method of controlling a switching power converter, the switching power converter including a transformer with parasitic capacitance, a first switch coupled to the transformer and configured to couple or decouple a load to or from a power source via the transformer, a switch controller coupled to the switch and configured to generate a switch drive signal for turning on or off the switch according to switching cycles, and a bypass circuit configured to provide a bypass path for the parasitic capacitance of the transformer, the method comprising:
  determining a timing associated with a voltage across the first switch within each switching cycle of the switching power converter; and
  enabling or disabling the bypass circuit based on the determined timing in each switching cycle,
  wherein the bypass circuit is enabled after a transformer reset point within each switching cycle of the switching power converter, the transformer reset point corresponding to when current through the load equals zero in each switching cycle.

11. The method of claim 10, further comprising enabling the bypass circuit after a zero-voltage switching point within each switching cycle of the switching power converter, the zero-voltage switching point corresponding to when voltage across the first switch equals DC input voltage to the switching power converter in each switching cycle.

12. The method of claim 10, further comprising disabling the bypass circuit within each switching cycle prior to a beginning of a subsequent switching cycle.

13. The method of claim 10, wherein the bypass circuit is enabled or disabled based upon direct sensing of voltage or current in a winding of the transformer.

14. The method of claim 10, wherein the bypass circuit comprises a second switch coupled in parallel with an auxiliary winding of the transformer, the bypass path including the second switch when the second switch is turned on.

15. The method of claim 10, wherein the bypass circuit comprises a second switch coupled in parallel with a primary winding of the transformer, the bypass path including the second switch when the second switch is turned on.

16. The method of claim 10, wherein the bypass circuit comprises a second switch coupled in parallel with a secondary winding of the transformer, the bypass path including the second switch when the second switch is turned on.

17. The method of claim 10, wherein the switching power converter is a flyback switching power converter with feedback sensing occurring on a primary side of the transformer.

\* \* \* \* \*